United States Patent
Haumont et al.

(10) Patent No.: US 6,233,458 B1
(45) Date of Patent: May 15, 2001

(54) RE-ROUTING PROCEDURE

(75) Inventors: Serge Haumont; Mauri Tikka, both of Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/256,832

(22) Filed: Feb. 24, 1999

Related U.S. Application Data

(63) Continuation of application No. PCT/FI98/00552, filed on Jun. 24, 1998.

(30) Foreign Application Priority Data

Jun. 24, 1997 (FI) .......................................... 972725

(51) Int. Cl.[7] .................................................. H04Q 7/38
(52) U.S. Cl. ........................... 455/445; 455/417; 455/466
(58) Field of Search ........................... 455/417, 445, 455/446, 452, 459, 553, 556, 557, 466; 370/469, 524, 221, 409, 422; 379/207, 220, 221, 242, 113, 134, 227, 229, 265, 269, 273

(56) References Cited

U.S. PATENT DOCUMENTS

| | | | |
|---|---|---|---|
| 4,233,473 | * | 11/1980 | Frost ........................... 455/432 |
| 5,276,731 | * | 1/1994 | Arbel et al. ................. 379/100.1 |
| 5,386,456 | * | 1/1995 | Schatz et al. ................. 455/436 |
| 5,495,471 | * | 2/1996 | Chow et al. .................. 370/221 |
| 5,636,217 | * | 6/1997 | Moelard ....................... 370/338 |
| 5,901,359 | * | 5/1999 | Malmstrom ................... 455/461 |
| 5,920,697 | * | 7/1999 | Masters et al. ............ 395/200.49 |
| 6,078,584 | * | 6/2000 | Mottishaw et al. ............ 370/385 |
| 6,144,857 | * | 11/2000 | Price et al. .................... 11/200 |

FOREIGN PATENT DOCUMENTS

| | | |
|---|---|---|
| 0 610 625 | 8/1994 | (EP) . |
| 0 734 187 | 9/1996 | (EP) . |
| 0 768 777 | 4/1997 | (EP) . |
| WO 95/24084 | 9/1995 | (WO) . |
| WO 98/29989 | 7/1998 | (WO) . |

\* cited by examiner

*Primary Examiner*—Nay Maung
*Assistant Examiner*—Jean Gelin
(74) *Attorney, Agent, or Firm*—Altera Law Group, LLC

(57) ABSTRACT

In a re-routing procedure according to the invention, in-stead of establishing a new connection, the context information is modified only in those network elements which the change in routing concerns. The necessary context information about the connection is loaded to the new network element. Additionally, the other network elements participating the connection are informed of the change of the network element.

15 Claims, 6 Drawing Sheets

RE-ROUTING PROCEDURE

This application is a Cont. of PCT/FI98/00552, filed Jun. 24, 1998.

FIELD OF THE INVENTION

This invention relates to re-routing of a connection which is routed via some key network elements holding context information about the connection.

BACKGROUND OF THE INVENTION

Telecommunication networks can be divided into circuit switched networks and packet switched networks. In circuit switched networks, the communication is allocated a circuit prior to the beginning of the transmission. An example of a circuit allocated to users A and B is given in FIG. 1 showing the allocated circuit that can only be used by these users. Information about the recipient of the sent information is readily included in the circuit identity. The main disadvantage of this switching method is that the circuit is reserved even though there is no information to be sent.

In connectionless packet switched networks, the transmission media is common to all users. The information is sent in packets, and all packets contain information about their destination. There is no need to allocate transmission resources for the communication prior to the beginning of the transmission. No packets are transmitted if there is no information to be sent. Thus, the network capacity is not reserved in vain. Based on the information about the destination included in the packet, every network element routes the packet to the next network element. The possible routes for the packets sent by user A to user B are shown in FIG. 2. Basically, all the packets sent from terminal A to terminal B do not necessarily travel through the same route.

In connection oriented packet switched techniques, a method of establishing virtual circuits is known. A virtual circuit comprises predetermined legs between network elements, and every packet in a connection is routed along the same route. Thus, the information is routed as in circuit switched networks shown in FIG. 1, but the communication capacity is not reserved (in vain) if there is nothing to be sent. Every packet includes information about its virtual circuit, and every network element holds context information which tells where to route a packet with a known virtual circuit to and what identifiers to use on the next leg. An example of a technique utilising virtual circuits is the well known ATM (Asynchronous Transfer Mode) technology.

It is also known that the methods of virtual circuit and connectionless packet switching with no virtual circuits can be combined. In such a method, there are some network elements via which all the packets are routed. An example of such a method is given in FIG. 3. In FIG. 3, a virtual circuit passing through network elements 12 and 22 is allocated between the sender A and network element 32. Network element 32 holds context information for the connection, and knows that the packets on that virtual circuit are destined to receiver B, which is connected to network element 53. Between network elements 32 and 52, a connectionless packet switched network is used, and packets from element 32 can be routed to element 52 along different paths. Though, all the packets are routed through network elements 12, 22, 32 and 53, which thus compose a virtual circuit between terminals A and B. It is worth noting that A would not be able to establish a connection with B if e.g. network element 32 would not hold the necessary context information concerning the connection. That information is not held by e.g. network element 31. Therefore, all the data packets of the connection have to be routed via network element 32 as well as through elements A, 12, 22, 53 and B, which are the key network elements of the connection.

An example of a system utilising virtual circuits is the General Packet Radio Service GPRS being specified by ETSI (European Telecommunications Standards Institute). The basic structure of the GPRS network is shown in FIG. 4. The elements shown are Serving GPRS Support Node (SGSN1, SGSN2), Gateway GPRS Support Node (GGSN1, GGSN2) and the BSS (Base Station Subsystem) consisting of a Base Station Controller (BSC1, BSC2) and many Base Transceiver Stations (BTS11, BTS12, BTS21, BTS22). Connections to other networks (not shown), such as Internet or an X.25 network, are made via the GGSN. Additionally, the network includes a Home Location Register (HLR) where e.g. information about the subscribed services is kept.

Basically, when a mobile station MS is located in a cell, every packet destined to or sent by mobile station MS is transmitted through the same BTS, same BSC, same SGSN and same GGSN. The MS cannot establish a connection to the GGSN if the used SGSN does not hold context information for this MS. The mobile MS is located in cell CELL11 and communicating with a BTS, BTS11, through the radio interface Um. Between the BTS and the SGSN, a virtual circuit is established, and all the packets are transmitted along the same route. In the connectionless packet switched network using the Internet Protocol (IP) between the SGSN and the GGSN, the transmission of different packets may use different routes.

The link between the mobile MS and the SGSN is uniquely identified by routing area RA and the Temporary Logical Link Identity TLLI. Routing area consists of one or several cells, and is used in the GPRS mobility management as location information for mobiles in a so-called standby state in which the mobile has no active connections. The TLLI identifies the connection unambiguously within one routing area. A mobile can have multiple simultaneous connections using different protocols, e.g. X.25 and IP. Connections using different protocols are discriminated using a Network Layer Service Access Point Identity NSAPI.

The application layer in the MS sends the SNDCP layer a PDP PDU (Packet Data Protocol Packet Data Unit) which can be, e.g., an IP packet. In the SNDCP layer, the PDU is encapsulated in an SNDCP packet in the header of which the NSAPI is indicated, and the resulting SNDCP packet is sent to LLC layer. The link layer identity TLLI is included in the LLC header. The LLC frames are carried over the air interface Um by the RLC (Radio Link Control) protocol and between the BSC and SGSN by the BSSGP (Base Station Subsystem GPRS Protocol). For downlink packets, the BSS checks the cell identity indicated in the BSSGP header, and routes the cells to the appropriate BTS. For the uplink packets, the BSC includes the BSSGP header the cell identity of the mobile MS based on the source BTS.

Between SSGN and GGSN, the link is identified by the SGSN and GGSN addresses and tunnel identifier TID which identifies the connection in the GGSN and in the SGSN. On the link between the SGSN and the GGSN, the GTP (GPRS Tunnelling Protocol) is used.

GPRS is a system where a kind of a virtual connection is used between MS and GGSN. This connection consists of two separate links, the MS-SGSN link and the SGSN-GGSN link. The MS and the GGSN are not able to communicate with each other if they are not using an SGSN holding the context information for this MS. Therefore, the SGSN in a key network element.

Routing of packets in the GPRS network is presented in the signalling chart of FIG. 5. In the figure, routing of both mobile originated (MO) and mobile terminated (MT) packets is shown. The routing of MO packets is studied first. The MS sends the BSS a data packet containing the TLLI, NSAPI and the user data. On the link between MS and SGSN, the SNDCP (Subnetwork Dependent Convergence Protocol) protocol on LLC (Logical Link Control) protocol is used. In a simple implementation, one BSC is always using the same SGSN, and therefore its function is to route the packets between many BTS's and one SGSN. In a more complicated implementation, the BSC is connected to a plurality of SGSN's and its routing function is also using the TLLI. In such implementation the key network elements of the connection are the MS, the BTS, the BSC, the SGSN and the GGSN that all hold context information necessary to route the packets belonging to the connection. In the BSS this information is stored in a look-up table. An example of a possible look-up table is shown the following:

| source | TLLI | destination |
|--------|------|-------------|
| SGSN1  | 11   | CELL11      |
| SGSN1  | 12   | CELL12      |
| SGSN2  | 21   | CELL11      |
| SGSN2  | 22   | CELL12      |
| CELL11 | 11   | SGSN1       |
| CELL11 | 21   | SGSN2       |
| CELL12 | 12   | SGSN1       |
| CELL12 | 22   | SGSN2       |

According to the look-up table above, e.g. packets with TLLI=11 received from SGSN1 are forwarded to BTS11 for transmission over the air interface Um in cell CELL11.

Each SGSN holds context information about each mobile it handles. In GPRS, the context information can be divided into mobility management (MM) and the packet data protocol (PDP) context part. Basically, the mobility management part tells where the mobile is located and in which state (idle, standby, ready) it is, and is common for all the different packet data services using different protocols. The packet data protocol part tells information specific for the service in question, and includes, e.g. routing information and PDP (packet data protocol) address used. Based on the context information, the SGSN maps the identifications TLLI and NSAPI used in the link between the SGSN and the MS to GGSN address and tunnel identifier TID, which identifies the connection between the SGSN and the GGSN. The GGSN then sends the data packet PDP PDU (PDP=Packet Data Protocol PDU=Protocol Data Unit) to the external packet data network.

For mobile terminated packets, the GGSN receives a packet sent to the MS from the external Packet Data Network (PDN). The GGSN knows which SGSN handles the connections of the MS and the identifier TID which identifies the connection in the SGSN. The packet is sent to the SGSN handling the MS, and the SGSN derives from the TID the TLLI, the NSAPI, the routing area identification RAI and eventually if not readily the cell identity CELLID. Based on this, the SGSN can send the packet to the right BSS. Using the TLLI, routing area and cell identity, the BSS can transfer the packet to the right MS. NSAPI is needed in the MS in order to be able to discriminate between different packet data protocols.

The problem of the above described routing method is its rigidity when a key network element in the connection has to be modified. In the case of GPRS, SGSN is the key network element in the connection between the MS and the GGSN. It is normally changed only if the MS moves to the coverage area of another SGSN, which is known as an inter-SGSN routing area update. A need for changing a key network element in the connection can arise for many other reasons, such as when a network element breaks down, a new network element is installed, when a network element has to be shut down for operation and maintenance reasons, or when the traffic load in a network element is too high. In prior art, the change of a key network element cannot be done without interrupting all the ongoing connections.

In GPRS, to change the SGSN via which the traffic from and to a routing area is routed, the network must be reconfigured and all the connections from mobiles in that routing area to the gateway GPRS support nodes GGSN must re-established. In practice the MS's have to reattach to GPRS and reactivate their PDP contexts. This causes unnecessary load in all network elements and in the transmission network, especially in the limited communication bandwidth on the radio interface Um.

The objective of this invention is to solve or at least relieve these problems. This objective is achieved by using a solution according to the invention which is defined in claim 1.

SUMMARY OF THE INVENTION

The basic idea of the invention is to change a key network element in a connection without interrupting the traffic.

In the re-routing procedure according to the invention, instead of cancelling existing connections and establishing a new one, the context information is modified only in those network elements which the change in routing concerns. All the necessary context information about the existing connections has to be loaded to the new key network element introduced into the connection. Additionally, other network elements handling the connection have to be informed that one of the network elements of the connection has changed.

The invention is advantageously realised in a inter-SGSN re-routing in a GPRS network. The procedure can be made transparent to the end stations. In the procedure, SGSN context is preferably loaded to the new SGSN advantageously from the old SGSN. The BSS is advised to route the mobile originated packets to the new SGSN. The GGSN is informed about the new SGSN address needed when routing the mobile terminated packets.

BRIEF DESCRIPTION OF THE FIGURES

The invention is described more closely referring to the enclosed schematic Figures, of which

DETAILED DESCRIPTION OF THE INVENTION

Figure 1:
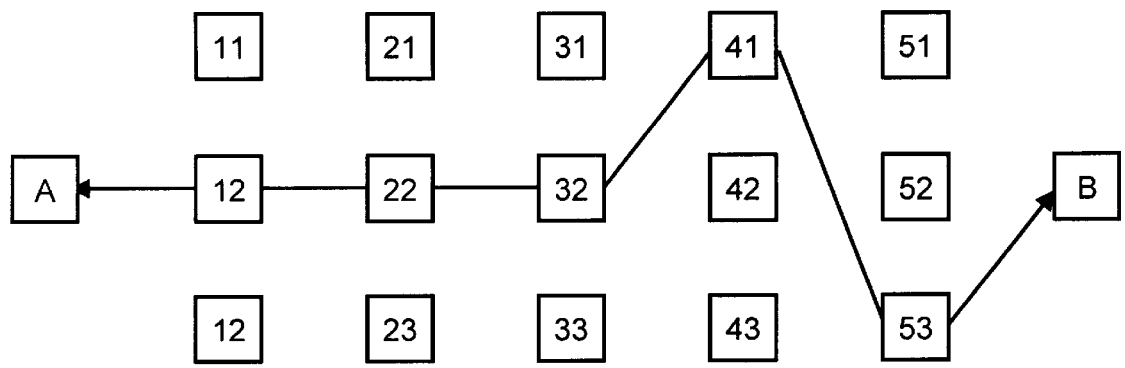
FIG. 1 shows a circuit switched connection.
Figure 2:
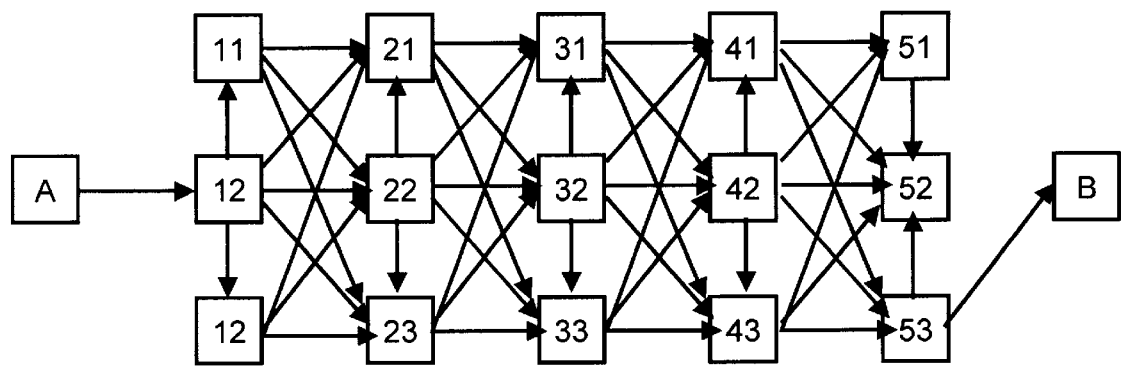
FIG. 2 shows a packet switched connection.
Figure 3:
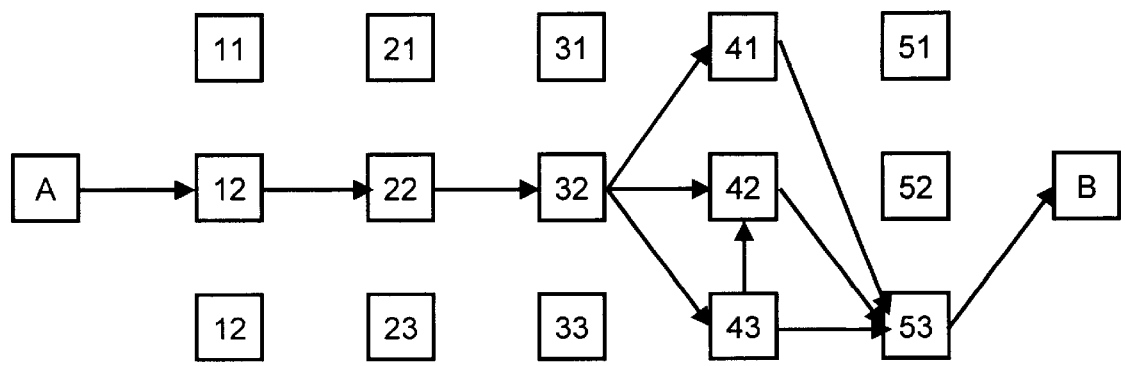
FIG. 3 shows a connection with a combination of a virtual circuit and a connectionless packet switched part.
Figure 4:
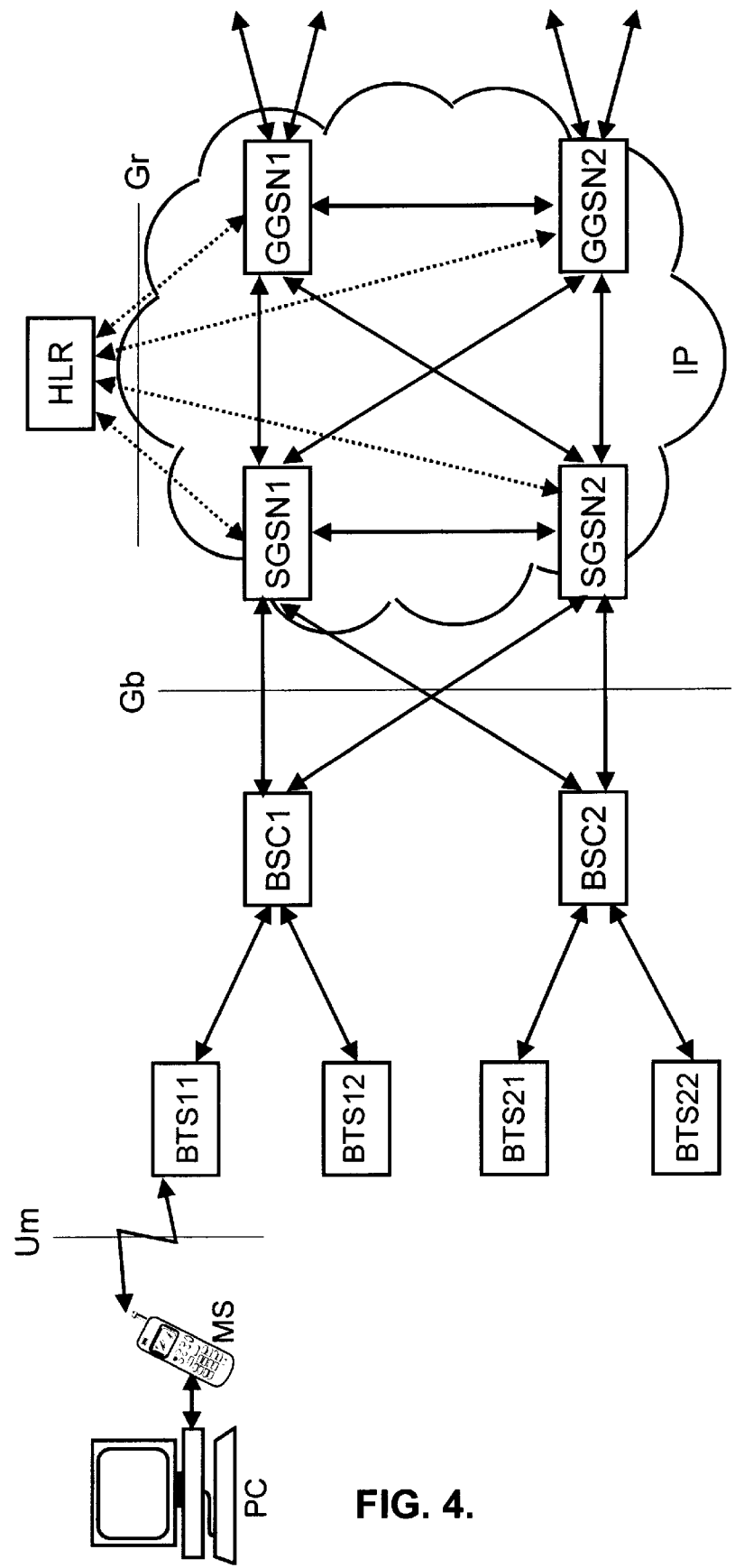
FIG. 4 shows the topology of the GPRS network.
Figure 5:
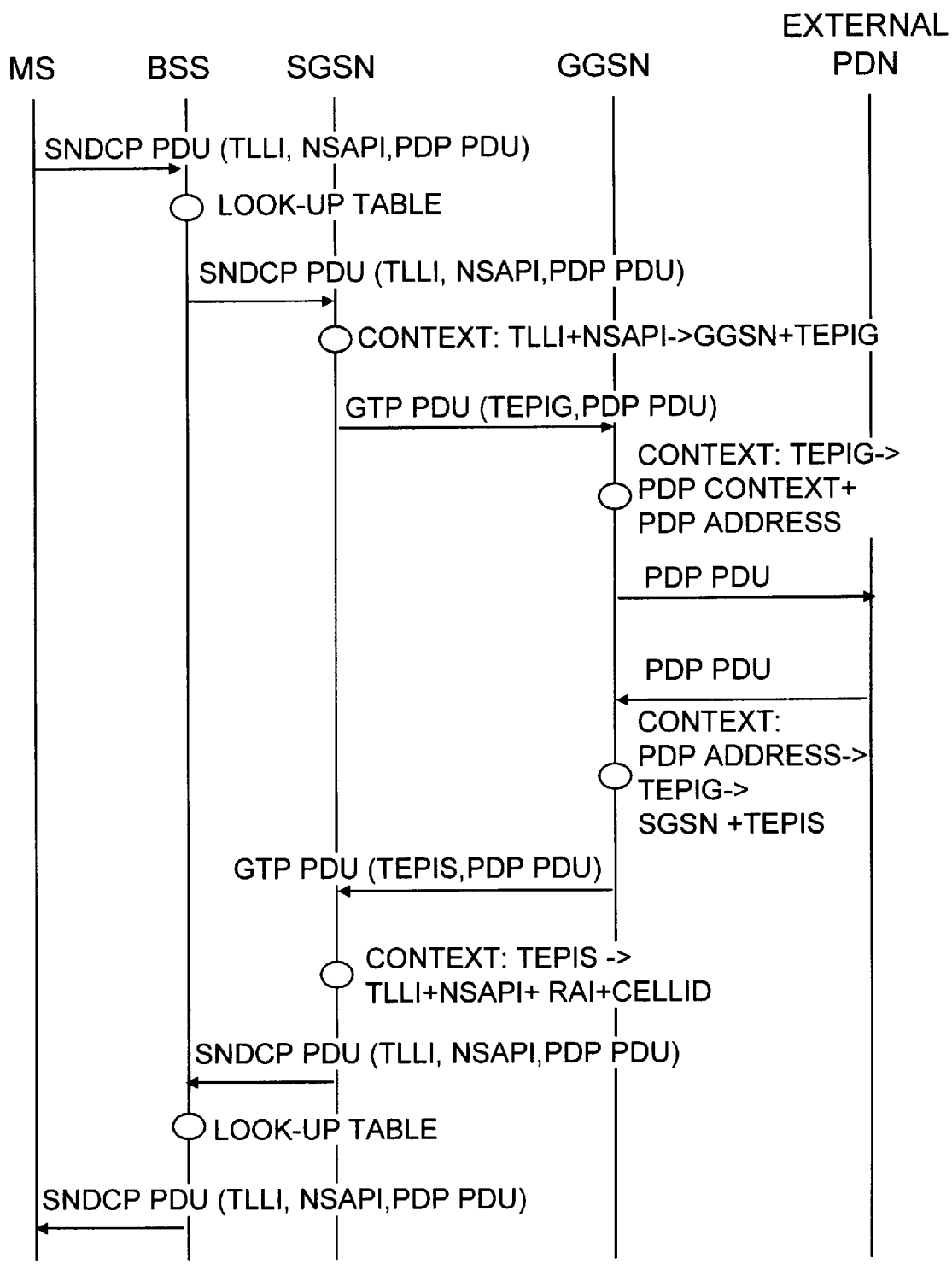
FIG. 5 shows the routing of a packet in the GPRS network.
Figure 6:
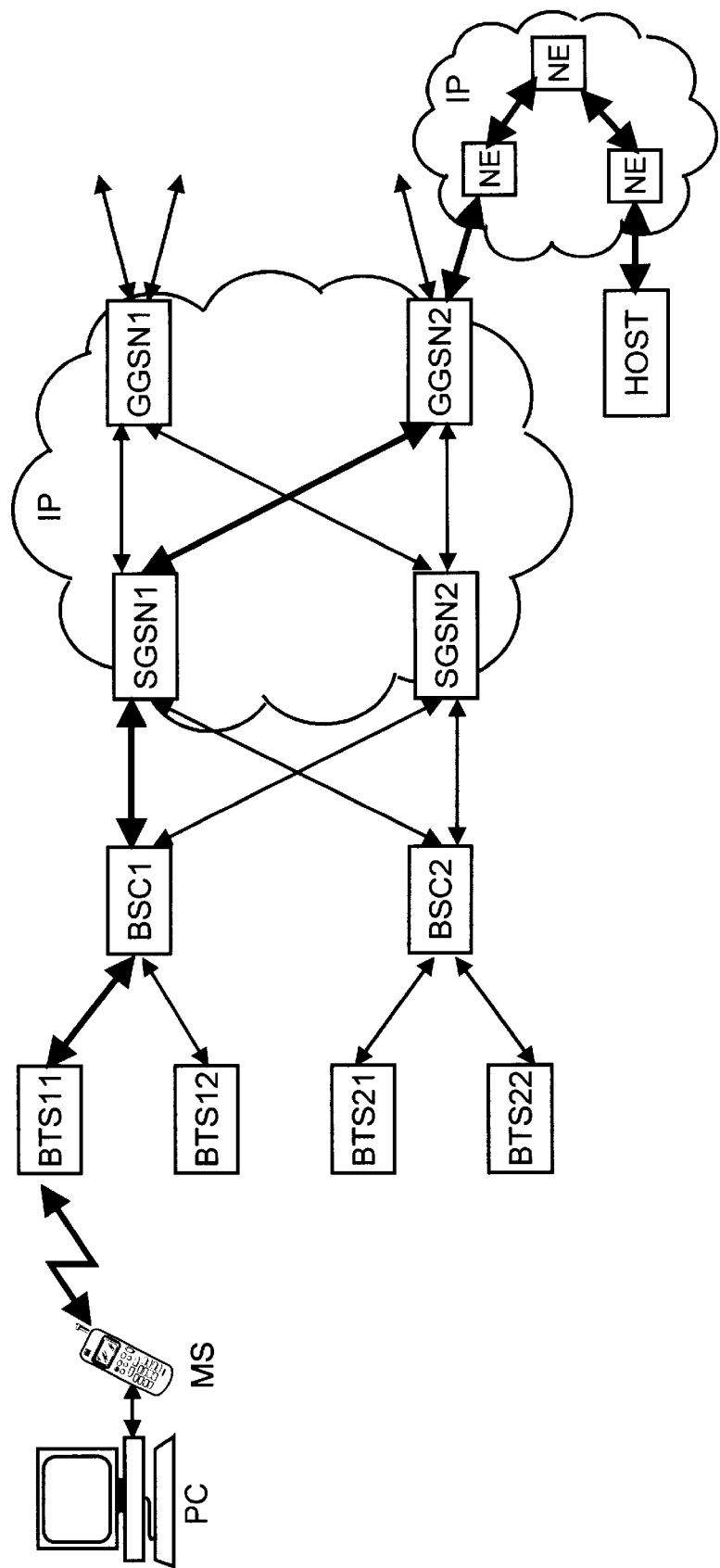
FIG. 6 shows a virtual connection in the GPRS network.
Figure 7:
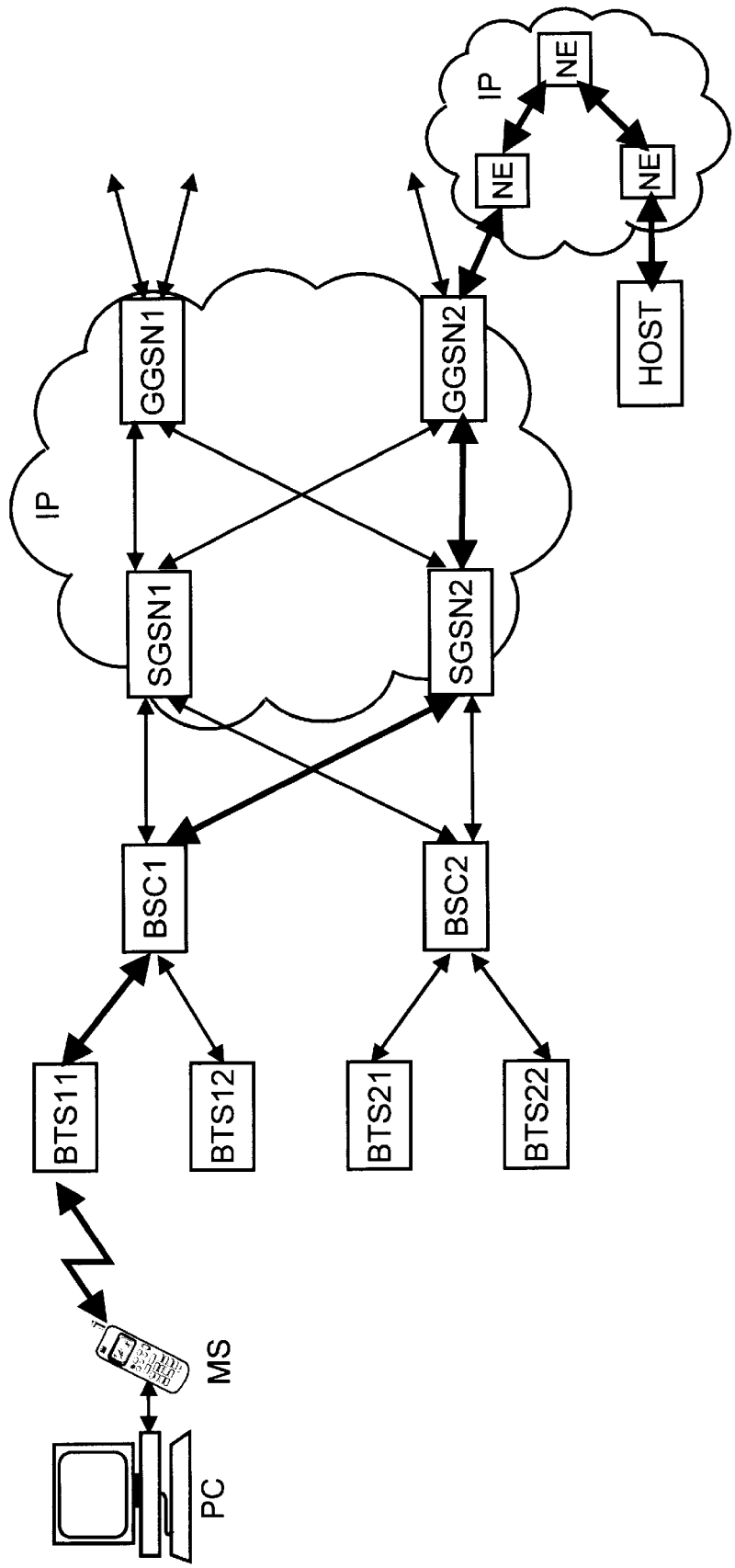
FIG. 7 shows a modified virtual connection in the GPRS network.

The routing of packets from and to a mobile MS before and after the re-routing of the connection and the information updates necessary to carry out the re-routing are now explained with the help of FIGS. 6 and 7.

FIG. 6 shows a connection between a mobile user and the host computer HOST which is connected to the Internet using the IP protocol. The IP address of HOST is 222.222.222.222. The mobile MS, whose IP address is 333.333.333.333, is using base station BTS11, which belongs to routing area RA1 (not shown).

The MS sends the HOST an IP packet P1 via the GPRS network. The IP packet is first encapsulated in an SNDCP packet (i.e., a data packet according to the SNDCP protocol) and then in an LLC frame containing the TLLI identity TLLI1, which identifies the link between the SGSN and the MS unambiguously within the routing area, and the NSAPI identifier NSAPI1, which specifies the protocol used. The LLC frame is then sent to BTS11.

BTS11 is connected to base station controller BSC1. All the packets sent by the MS are routed via BSC1. When receiving the packet from a BTS, the BSC adds to the packet the cell identity CELLID11 of the cell covered by the BTS. BSC1 holds information about the particular SGSN the packets shall be sent to. In this case, all the packets coming from RA1 are sent to SGSN1.

SGSN1 contains more specific context information about every connection it handles. It maintains information about the location of the mobile with the accuracy of one routing area (when the mobile is in standby state) or one cell (mobile in ready state). When receiving a LLC frame from the BSC, the SGSN identifies the mobile that has sent the packet. The identification is based on the cell identity CELLID11 and TLLI information included in the packet. With the help of this information, the NSAPI identity included in the packet and the SGSN context information concerning the mobile, the SGSN decides that the user data packet included in the SNDCP-packet must be sent to GGSN2. The context information also contains the TID identifier TID1, which identifies the link for this MS between SGSN1 and GGSN2. SGSN1 generates a GTP (GPRS Tunnelling Protocol) packet including the user data packet, the address of the GGSN2 and the TID, and sends it to GGSN2.

When receiving the GTP packet, GGSN2 knows, based on the TID identity and the GGSN context information, which MS has sent the packet. GGSN2 then sends the IP packet P1 to the external packet data network.

When replying, HOST is sends a (mobile terminated) packet P2 destined to the IP address 333.333.333.333 of the MS. Based on the IP address of the MS, the IP packet is first routed to the GGSN2. Based on the GGSN context information, GGSN2 then knows that the address belongs to the MS, that the MS is handled by SGSN1 and that the connection between GGSN2 and MS is identified in the SGSN with identifier TID1. Based on this, GGSN2 sends SGSN2 a GTP packet including the IP packet P2 sent by HOST and the TID identity TID1.

In SGSN1, the TID identity of the GTP packet is used to derive the routing area RA1, the cell identity CELLID11 TLLI1 and NSAPI1. If the cell identity of the cell where the mobile is located in is not readily known, the MS is paged in all the cells of the routing area. NSAPI1 and TLLI1 are included together with the user data in an LLC frame which is then sent to the MS through right BSC. The right BSC is derived from the cell identity CELLID11, which is indicated to the BSC in the header of the BSSGP protocol. The BSC forwards the frame to the MS via BTS11, and the MS decapsulates the IP packet from the LLC frame.

At this point, the need to reduce the traffic load of SGSN1 is observed. The need may arise e.g. when an SGSN malfunction is observed and the SGSN has to be shut down for operation & maintenance reasons or when the traffic load in a network element is too high. Alternatively, if a new SGSN is installed, some of the traffic load previously handled by SGSN1 may be moved to the new SGSN.

The O&M makes a decision of how many connections (o.e. MS's) or routing areas are moved to be handled by another SGSN. To minimise the changes in the system, it is advantageous to move all the GPRS traffic from one or more routing areas. In our example, all the connections from routing area RA1 are moved to SGSN2. This example is valid also if the connections of only a list of MS's from routing area RA1 are transferred to RA2. To achieve this, the SGSN context information relating to the MS's in RA1 must be loaded to the new SGSN, SGSN2. Additionally, the BSC must be informed that the packets from routing area RA1 shall from now on be sent to SGSN2. To be able to route the mobile terminated packets via the correct SGSN, the GGSN has to be informed about the new SGSN address (SGSN2). The TID identifier TID1 will remain the same.

After the re-routing procedure, both mobile terminated and mobile oriented packets are routed via SGSN2. Routing of packets between MS and HOST after the re-routing procedure is shown in FIG. 7.

Let us now follow the route of an IP packet P3 sent by the MS to the HOST. Compared to the functions performed before the re-routing procedure, there are no changes in the functions of the mobile MS and the base station BTS11. The MS still sends LLC packets including the TLLI, the NSAPI and the user data. BSC1 adds, as before, the cell identity CELLID in the header of the BSSGP packet it constructs, but now sends the packet to the new SGSN SGSN2. The only change in the BSC function is thus the new SGSN address SGSN2, to which the packets are now sent.

SGSN2 receives the packet and, with the help of the loaded context information, maps the TLLI identity and the NSAPI to GGSN identity GGSN2 and to the tunnel identity TID TID1. It then sends GGSN2 a GTP packet including the user data and the TID.

GGSN2 uses, as before, the TID identifier of the GTP packet to identify the subscriber identity IMSI and the IP address 333.333.333.333 of the MS. Then, the IP packet P3 encapsulated in the GTP packet and containing the user data, the destination address 222.222.222.222 and the IP address 333.333.333.333 of the sender is sent to its destination, i.e. to HOST. For mobile oriented packets, the GGSN function is thus just the same as it was before the re-routing procedure.

As HOST sends the MS a mobile terminated packet P4 using the IP address 333.333.333.333 of the mobile, the packet is, as before, first routed to GGSN2. GGSN2 now uses the IP address to identify the MS identity IMSI, the TID and the SGSN identity SGSN2 according to the changes in the GGSN context. The GGSN sends the SGSN SGSN2 a GTP packet containing the received IP packet and TID identity TID1.

SGSN2 receives the GTP packet, and, according to the loaded SGSN context information, maps the TID identity TID1 to routing area RA1, to cell identity CELLID11, to TLLI1 and to NSAPI1. TLLI1, NSAPI1 and CELLID1 are is included together with the user data in an LLC frame which is then sent to the right BSC.

The BSC receives the LLC frame and, based on the TLLI identity TLLI1 in the packet, forwards the packet to the MS via BTS11. Again, there are no changes in the functions of BTS11 and MS as compared to their functions before the re-routing procedure.

Figure 8:
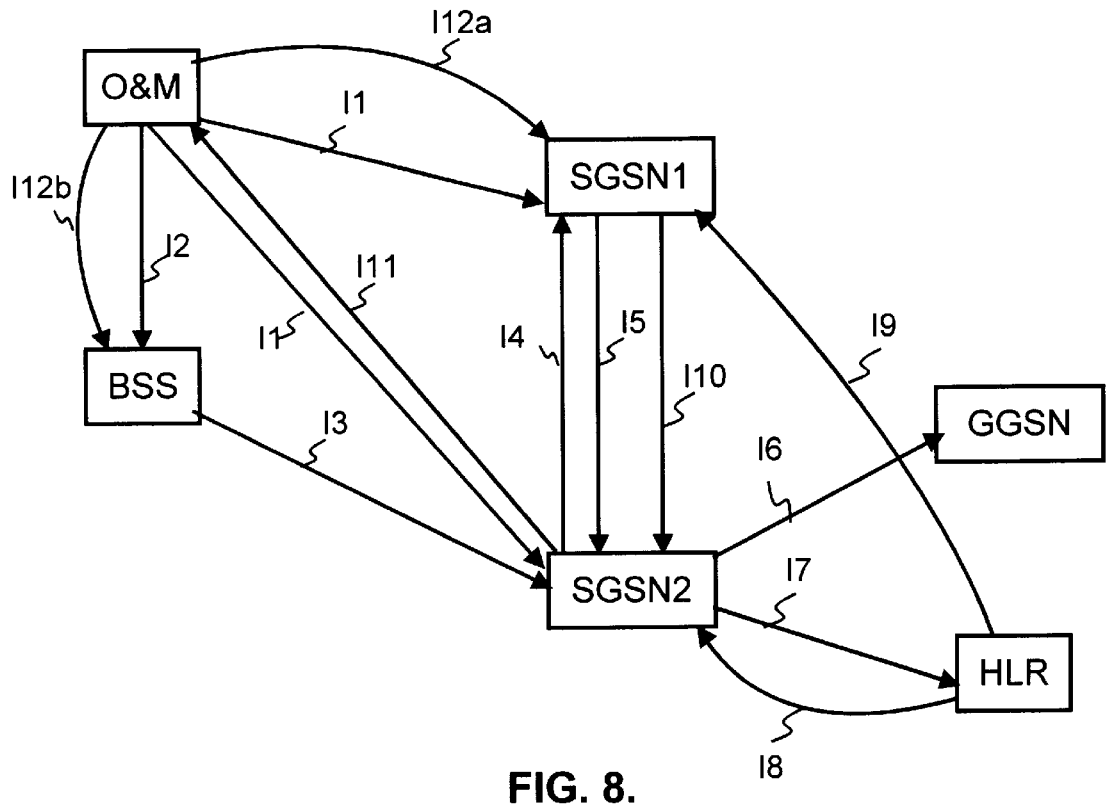
FIG. 8 shows the flow of information in the re-routing procedure in one embodiment of the invention and FIG. 9 shows the flow of information in the re-routing procedure in another embodiment of the invention.

The flow of information needed in the re-routing procedure can be handled in various ways. In one embodiment of the invention, the traffic load is moved to the new SGSN smoothly. The flow of information in this embodiment is illustrated in FIG. 8. In this example, the traffic from on routing area RA1 is transferred to a new SGSN, SGSN2, to be handled there.

O&M informs SGSN1 and SGSN2 that traffic from routing area RA1 previously handled by SGSN1 will be moved to be handled by SGSN2 by sending them a messages I1a and I1b, respectively. Then O&M informs the BSS is informed that all the mobile oriented (MO) traffic from RA1 shall be routed to SGSN2 by sending the BSS a message I2. From this point, the MO packets are routed through SGSN2. SGSN1 can, if needed, force the MSs to generate uplink packets by sending them a message, e.g. by paging them. The new SGSN receives from the MS MS1 a packet I3 coming from a cell of RA1 and using a local TLLI unknown to SGSN2. SGSN2 determines the old SGSN (SGSN1) based on the cell identity. The SGSN2 requests the context information concerning the MS from SGSN1 using e.g. the SGSNContextRequest-message I4 in a way similar to the inter-SGSN routing area update.

Having received the requested context (message I5, SGSNContextResponse), SGSN2 may perform security functions like authentication and allocation of a new TLLI. SGSN2 informs the relevant GGSN(s) about the new SGSN address to be used to forward packets to MS1 using the Update PDP Context Request procedure I6. Having done this SGSN2 initiates an update location procedure by sending message I7 toward the HLR. As a response to message I7 the HLR send the subscriber data of the MS's in RA1 to SGSN2 in message I8. If needed, it will also perform the Location Updating procedure toward MSC/VLR. Additionally, the HLR sends a Cancel Location message I9 to the old SGSN SGSN1 to inform SGSN1 that it can now delete its context information concerning MS1. This is preferably done after a certain delay because some data packets may still be on their way from the GGSN to the old SGSN. The MS must also be informed about the new TLLI (if allocated). The old SGSN can now start forwarding data packets I10 stored in the old SGSN, and not yet acknowledged by MS1 to the new SGSN. The packets may be associated with an indication about when they we sent so that SGSN2 knows when the possible retransmission should be performed.

It is worth noting that messages from I4 to I10 are very much similar to messages used in InterSGSN Routing Area Update procedure and that their order can be changed. Therefore, the implementation of this invention requires no major changes in the network.

When the traffic is handled by SGSN2, SGSN2 informs the O&M in message I11 that the connections are now re-routed. The virtual circuits from SGSN1 to the cells of the routing area can be cancelled. The O&M can eventually send messages I12a and I12b commanding SGSN1 and the BSS to cancel the virtual circuits. Additionally, the neighbouring GPRS support nodes must be informed that the routing area is now handled by a new SGSN, SGSN2. This can be done e.g. via O&M. This is, however, not necessary if the SGSN address can be derived from TLLI coding.

Figure 9:
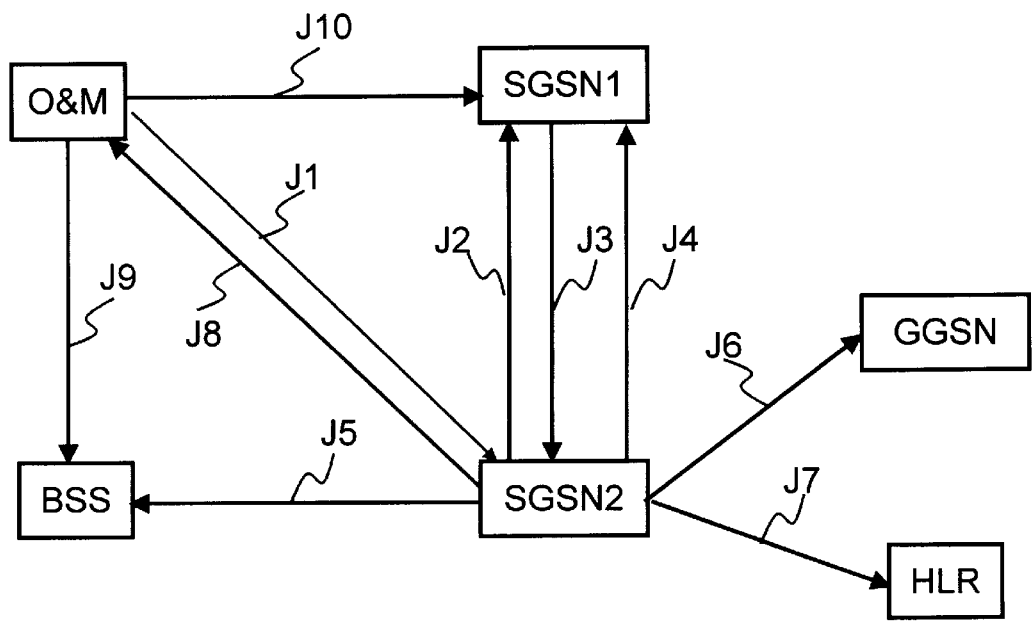

In another embodiment of the invention, the SGSN context information is moved to the new SGSN before the actual change of SGSN. The flow of information is described in FIG. 9. The procedure of changing the SGSN serving a routing area is started by the O&M by informing SGSN1 and SGSN2 about the re-routing. This can be done e.g. by sending SGSN2 a message J1. As a response to J1, SGSN2 queries the context information from SGSN1 by sending message J2. SGSN1 provides the queried information in message J3, which advantageously includes context of all the connections that are to be moved to be handled by SGSN2 in a single message. SGSN2 saves the information to a sleeping database, and at this point, all the traffic goes through SGSN1 just as before. SGSN1 forwards all the changes in the SGSN contexts regarding those mobiles (and their connections) that are being moved to SGSN2 in order to keep the sleeping database up-to-date. In an alternative embodiment, the changes in the SGSN context are stored locally in SGSN 1 until they are explicitly requested by SGSN2. This embodiment minimises the signalling needed.

When the sleeping database contains all the SGSN context information regarding those mobiles that are about to be moved to be handled by SGSN2, the actual re-routing can take place. Firstly, the virtual connection between the BSS and SGSN2 must be established. This is done by sending the BSS message J5, which gives the BSS the necessary information it need for modification of its routing table. Secondly, the GGSN(s) is (are) sent a PDPContextRequest message J6, which informs the GGSN about the list of MS's for which the SGSN address has to be changed. In an alternative embodiment, this information can be stored in the GGSN temporarily in a sleeping database. Thirdly, the HLR is sent a message UpdateLocation J7, which informs the HLR of the new SGSN address of the mobiles in the routing area. The messages J6 and J7 are acknowledged (not shown). At this point, SGSN2 can inform the O&M that all the network elements hold the necessary context information (message J8).

The O&M sends the BSS a message J9, which tells the BSS to start routing the frames coming from a given list of MS's to SGSN2. Similarly, the SGSN1 is sent a message J10, which tells that the context information for the mobiles that were moved to be handled by SGSN2 can now be deleted after eventually having sent the latest update.

For both previous embodiments the new SGSN SGSN2 can either re-establish the LLC link (as done in a normal inter-SGSN routing update) or maintain the link despite of the change. If the LLC link is re-established, SGSN2 needs to inform the MS. This can be done e.g. by performing an authentication procedure or by sending an explicit message (similar to the Routing Area Update Accept-message) containing the TLLI, PLMN (Public Land Mobile Network), supported mobile terminal capabilities, LLC acknowledgement and cause parameter. The MS shall answer by a message containing TLLI and LLC acknowledgement If the LLC link is maintained, some additional information must be included in the message I5 or J3 sent from SGSN1 to SGSN2. This information is:

the cell identity of the cell where the MS is currently located to allow SGSN2 to send the unacknowledged packets directly to BSS (if the service does not require the order of packets to be maintained)

information about ciphering
information about compression
information about the frames acknowledged if acknowledged transfer is used.

The traffic from and to a single routing area RA1 may in some situations be handled by two different SGSN's. During the procedure, it may happen that a mobile MS2 in routing area RA1 that is being moved to be handled by SGSN2 is moving to another routing area RA2 handled by a third SGSN SGSN3. In this case, SGSN3 derives based on the old routing area RA1 the address of the SGSN that holds the context information of the mobile. This can be done based on an internal table in SGSN3 or optionally from a domain name server (DNS). If it finds out that RA1 is handled by SGSN1 it requests for the context information from SGSN1 which is, however, no longer in charge of the mobile in question and has therefore not all the needed information. In this case SGSN1 can forward the request to SGSN2 now handling the mobile. SGSN2 may reply the request directly to the SGSN3 or via SGSN1.

Alternatively, if SGSN1 can send SGSN3 a failure message. As a response to receiving the failure message SGSN3 asks for the IMSI of the mobile, and interrogates the HLR with the IMSI key. As a response, the HLR returns the new SGSN address SGSN2 of the mobile.

Yet another possible solution is include the TLLI coding a digital signature which allows any other SGSN to find out which SGSN has allocated a given TLLI. The benefit of this embodiment is that the SGSN does not have to check the old routing area. On the other hand, the reallocation of TLLI is compulsory.

Another problem caused by the situation of two SGSN's handling a single routing area is that a single TLLI should not be allocated twice within a single routing area. It must be noted that the probability of a double allocation is low. Therefore, the situation of a double allocated TLLI can at least in some cases be handled by defining it as an error state which leads to reallocation of TLLI's for both the MS's sharing the same TLLI. The problem can as well be solved e.g. by including the TLLI coding a time stamp. In this case, the TLLI would comprise two parts, the code allocated by the SGSN and the time of allocation. A single TLLI would be double allocated only if two SGSN's would allocate the same code simultaneously. Another possible solution is to include the TLLI an identifier identifying the SGSN that allocated the TLLI. The identifier can be reused e.g. every eighth SGSN, thus reducing the number of bits needed to code the identifier to three.

In the re-routing procedure, a various number of connections can be re-routed. Referring to GPRS, the re-routing can be done e.g. for one connection or a plurality of connections of one MS. In this case, however, the BSS should also need to examine the TLLI and eventually also the NSAPI identity of all the packets to be able to route the packets to the right SGSN. Another possibility is to re-route the connections from or to a single mobile or a plurality of mobiles within one routing area. In this case, care must be taken to handle the mobility management in a situation where traffic from one routing area is handled by two or more SGSN's. A third alternative is to re-route all the traffic from and to one routing area, a plurality of routing areas or all the traffic handled by one SGSN. In these latter situations, no confusion can occur due to situations where several SGSN's are handling traffic from and to a single routing area.

The use of the invention is not limited to the above described case where the connections are handed over from one SGSN to another, but the invention can be implemented to any network comprising similar key network elements. As an example, the GGSN can be changed during a connection in a similar way.

The invention improves the network reliability by making the re-routing of connections more feasible. Thus, a lower reliability of an individual network element can be accepted, and the amount of duplication of modules in the network elements reduced. Further, network elements with lower traffic capacity can be used, because the possible local overload can be distributed to other network elements in the neighbourhood. Further, the operation and maintenance operations are easier to realise. These aspects have an important impact on the costs of the network elements, and, as a clear consequence, on the cost of the whole network.

What is claimed is:

1. A method for rerouting an ongoing connection in a telecommunications network comprising a plurality of network elements, the connection being routed through several network elements, at least two of the network elements being key network elements of the connection, each key network element holding context information about the connection, said information including the address of at least one other key network element of the connection, said method comprising, during an ongoing connection:
   monitoring the network to determine a need to replace any one of said key network elements on the connection by another network element, said another network element replacing said one key network element without changing an access node such as a base station; and
   as a response to having determined the need:
      loading necessary context information to said another network element; and
      replacing, in the context information stored in other key network elements of the connection the address of the key network element to be replaced by the address of said another network element.

2. A method according to claim 1, wherein the telecommunications network is a packet switched telecommunications network.

3. A method according to claim 1, wherein:
   the telecommunications network is a mobile telecommunications network comprising mobile stations, base stations, and cells defined by the coverage areas of the base stations; and
   the re-routing method is triggered independent of the movement of the mobile stations.

4. A method according to claim 3 for implementing re-routing in a General Packet Radio Service network comprising a base station subsystem, at least two serving support nodes and a gateway support node, wherein, in the re-routing procedure, a first serving support node used by the connection is replaced by a second serving support node.

5. A method according to claim 1, wherein the re-routing procedure is triggered by an operation and maintenance system of the network.

6. A method according to claim 3 for implementing re-routing in a General Packet Radio Service network comprising a base station subsystem, at least two network nodes that can act as serving support nodes, and at least one gateway support node, wherein:
   an operation and maintenance system of the network informs the base station subsystem to change the serving support node to which it routes the packets belonging to a certain connection from a first serving support node to a second serving support node; and
   as a response to receiving a packet belonging to the connection, the second serving support node loads the context information concerning the connection from the first serving support node, and informs the gateway support node about the new, second, serving support node and about an identifier identifying the connection in the second serving support node.

7. A method according to claim 3 for implementing a re-routing in a General Packet Radio Service network comprising a base station subsystem, at least two network nodes that can act as serving support nodes, and at least one gateway support node, wherein:

as a response to detecting a need to transfer a connection from a first serving support node to a second serving support node, an operation and maintenance system of the network tells the second serving support node to start downloading the context information concerning the connections from the first serving support node;

the second serving support node downloads the information into a sleeping database;

the base station subsystem is informed about the new, second, serving support node used in the connection; and the gateway support node is informed about the new, second, serving support node used in the connection and about an identifier identifying the connection in the second serving support node.

8. A method according to claim 7, wherein the sleeping database is kept up-to-date by the first serving support node.

9. A method according to claim 1, wherein, as a response to receiving at a first network element a request for information concerning the connection that has been re-routed by replacing said one network element of the connection by said another network element, the request is forwarded to said another network element now handling the connection.

10. A telecommunications network comprising a plurality of network elements, said network comprising:

means for establishing virtual connections between users and several network elements, each network element holding context information about connections passing through that particular network element, said information including addresses of at least one other network element used by the connection;

monitoring means for monitoring a need to replace, without replacing an access node such as a base station, a first network element on the connection by a second network element;

triggering means responsive to the monitoring means for triggering the re-routing procedure;

means for loading context information from the first network element to the second network element; and means for replacing the address of the first network element by the address of the second network element in the context information stored in other network elements of the connection.

11. A network according to claim 10, wherein the network is a packet switched telecommunications network.

12. A network according to claim 10, wherein the network is a mobile telecommunications network.

13. A network according to claim 12, wherein the network is a General Packet Radio Service network.

14. A network element for a packet switched telecommunication network, the network element having context information about at least some of the connections passing through that particular network element, said network element comprising:

means for maintaining a sleeping database;

means for downloading context information from another network element into the sleeping database as a response to receiving a message triggering a re-routing procedure; and means for allowing the sleeping database to be dynamically updated by another network element.

15. A method according to claim 3, wherein the re-routing procedure is triggered by an operation and maintenance system of the network.

* * * * *